(12) United States Patent
Seibold et al.

(10) Patent No.: US 9,637,030 B2
(45) Date of Patent: May 2, 2017

(54) VEHICLE SEAT WITH A LUMBAR SUPPORT

(71) Applicant: Johnson Controls Technology Company, Holland, MI (US)

(72) Inventors: Kurt Seibold, Whitmore Lake, MI (US); Alexander I Balin, Ann Arbor, MI (US); Ingo Kienke, Wermelskirchen (DE); Jorg Linnenbrink, Wuppertal (DE)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/398,498

(22) PCT Filed: May 7, 2013

(86) PCT No.: PCT/US2013/039855
§ 371 (c)(1),
(2) Date: Nov. 3, 2014

(87) PCT Pub. No.: WO2013/169714
PCT Pub. Date: Nov. 14, 2013

(65) Prior Publication Data
US 2015/0091345 A1 Apr. 2, 2015

Related U.S. Application Data

(60) Provisional application No. 61/643,587, filed on May 7, 2012.

(51) Int. Cl.
*A47C 7/46* (2006.01)
*B60N 2/235* (2006.01)
(Continued)

(52) U.S. Cl.
CPC ............... *B60N 2/235* (2013.01); *B60N 2/07* (2013.01); *B60N 2/0715* (2013.01);
(Continued)

(58) Field of Classification Search
CPC .................................. B60N 2/66; B60N 2/686
(Continued)

(56) References Cited

U.S. PATENT DOCUMENTS 3,220,767 A 11/1965 Hendrickson
3,695,696 A 10/1972 Lohr et al.
(Continued)

FOREIGN PATENT DOCUMENTS

DE 893854 C 10/1953
DE 2152104 A1 4/1973
(Continued)

OTHER PUBLICATIONS

International Preliminary Report on Patentability for Application No. PCT/US2013/039855; dated Nov. 20, 2014.
(Continued)

*Primary Examiner* — David R Dunn
*Assistant Examiner* — Alexander Harrison
(74) *Attorney, Agent, or Firm* — The Dobrusin Law Firm, P.C.

(57) ABSTRACT

Vehicle seat (1), with a seat part (2) and a backrest (3), which comprises a lumbar support (7), wherein the lumbar support (7) has a lumbar apex (7.1) towards the back of a seat occupant and tapers from there and that the lumbar support comprises a suspension 9, 11, 12) that results in load distribution with a primery load uptake (8. 1) at the lumbar apex (7.1).

10 Claims, 3 Drawing Sheets

(51) Int. Cl.
*B60N 2/22* (2006.01)
*B60N 2/68* (2006.01)
*B60N 2/07* (2006.01)
*B60N 2/16* (2006.01)
*B60N 2/18* (2006.01)
*B60N 2/427* (2006.01)
*B60N 2/66* (2006.01)
*B60N 2/08* (2006.01)
*B60N 2/20* (2006.01)

(52) U.S. Cl.
CPC ............ *B60N 2/0722* (2013.01); *B60N 2/08* (2013.01); *B60N 2/161* (2013.01); *B60N 2/1615* (2013.01); *B60N 2/1814* (2013.01); *B60N 2/20* (2013.01); *B60N 2/22* (2013.01); *B60N 2/427* (2013.01); *B60N 2/66* (2013.01); *B60N 2/68* (2013.01); *B60N 2/686* (2013.01); *B60N 2205/20* (2013.01)

(58) Field of Classification Search
USPC ............... 297/284.4, 216.13, 216.14, 452.31
See application file for complete search history.

(56) References Cited

U.S. PATENT DOCUMENTS

| | | |
|---|---|---|
| 3,759,587 A | 9/1973 | Christin |
| 3,874,727 A | 4/1975 | Mehnert et al. |
| 3,877,750 A | 4/1975 | Scholpp |
| 4,379,589 A | 4/1983 | Marino |
| 4,451,085 A | 5/1984 | Franck et al. |
| 4,502,730 A | 3/1985 | Kazaoka et al. |
| 4,585,272 A | 4/1986 | Ballarini |
| 4,647,109 A | 3/1987 | Christophersen et al. |
| 4,913,493 A | 4/1990 | Heidmann |
| 4,995,669 A | 2/1991 | Croft |
| 4,997,223 A | 3/1991 | Croft |
| 5,067,772 A | 11/1991 | Koa |
| 5,154,476 A | 10/1992 | Haider et al. |
| 5,163,735 A | 11/1992 | Aljundi |
| 5,251,864 A | 10/1993 | Itou |
| 5,320,410 A | 6/1994 | Faiks et al. |
| 5,346,281 A | 9/1994 | Hughes |
| 5,433,507 A | 7/1995 | Chang |
| 5,466,048 A | 11/1995 | Fowler et al. |
| 5,468,048 A | 11/1995 | Clemens et al. |
| 5,577,811 A | 11/1996 | Ogg |
| 5,704,691 A | 1/1998 | Olson |
| 5,733,008 A | 3/1998 | Tame |
| 5,934,753 A | 8/1999 | Lange |
| 5,984,407 A * | 11/1999 | Ligon, Sr. ................ B60N 2/66 297/284.1 |
| 6,022,075 A | 2/2000 | Blocker et al. |
| 6,193,318 B1 | 2/2001 | Becker et al. |
| 6,341,819 B1 | 1/2002 | Kojima et al. |
| 6,422,651 B1 | 7/2002 | Mühlberger et al. |
| 6,520,581 B1 | 2/2003 | Tame |
| 6,565,156 B1 | 5/2003 | Yamashita et al. |
| 6,592,186 B1 | 7/2003 | Mühlberger et al. |
| 6,609,753 B2 | 8/2003 | Schmidt-Schaeffer |
| 6,935,693 B2 | 8/2005 | Janscha et al. |
| 6,955,399 B2 | 10/2005 | Hong |
| 7,278,686 B2 | 10/2007 | Yoshida |
| 7,740,316 B2 | 6/2010 | Beneker et al. |
| 7,837,273 B1 | 11/2010 | Ratza et al. |
| 7,926,879 B2 | 4/2011 | Schmitz et al. |
| 7,959,229 B2 | 6/2011 | Ishijima et al. |
| 8,162,404 B2 | 4/2012 | Ueda |
| 8,333,530 B2 | 12/2012 | Omori |
| 8,376,456 B2 | 2/2013 | Fujita et al. |
| 8,480,152 B2 | 7/2013 | Shimizu |
| 2002/0060487 A1 | 5/2002 | Makosa |
| 2002/0089225 A1 | 7/2002 | Bruck et al. |
| 2003/0006636 A1 * | 1/2003 | Ligon, Sr. ................ A47C 7/46 297/284.4 |
| 2003/0218368 A1 | 11/2003 | Akaike et al. |
| 2004/0160099 A1 * | 8/2004 | Hong ...................... B60N 2/66 297/284.4 |
| 2005/0062326 A1 | 3/2005 | Kim et al. |
| 2005/0179290 A1 * | 8/2005 | Hancock .............. B60N 2/0228 297/284.4 |
| 2005/0285008 A1 | 12/2005 | Beneker et al. |
| 2006/0055219 A1 | 3/2006 | Heimann et al. |
| 2006/0152051 A1 * | 7/2006 | Colja ..................... A47C 7/465 297/284.4 |
| 2006/0226683 A1 * | 10/2006 | Massara .................. B60N 2/66 297/284.4 |
| 2006/0244293 A1 * | 11/2006 | Buffa ..................... B60N 2/66 297/284.4 |
| 2007/0090263 A1 | 4/2007 | Yamada et al. |
| 2007/0108816 A1 * | 5/2007 | McQueen ............... A47C 7/465 297/284.4 |
| 2009/0026811 A1 * | 1/2009 | Samain .................... A47C 7/46 297/125 |
| 2009/0096263 A1 * | 4/2009 | Samain .................. A47C 7/465 297/284.4 |
| 2009/0174241 A1 * | 7/2009 | Pattyn ..................... B60N 2/66 297/284.4 |
| 2009/0288270 A1 | 11/2009 | Yamashita |
| 2010/0026069 A1 | 2/2010 | Bruck et al. |
| 2010/0026070 A1 | 2/2010 | Rohee et al. |
| 2010/0096897 A1 | 4/2010 | Kienke et al. |
| 2010/0117419 A1 | 5/2010 | Schmitz et al. |
| 2010/0133732 A1 | 6/2010 | Yamaguchi et al. |
| 2010/0201173 A1 | 8/2010 | Boes |
| 2011/0006581 A1 | 1/2011 | Funk et al. |
| 2011/0042514 A1 | 2/2011 | Ehlers et al. |
| 2011/0042515 A1 | 2/2011 | Schoke et al. |
| 2011/0115268 A1 * | 5/2011 | Maierhofer ............... B60N 2/66 297/284.4 |
| 2011/0127817 A1 * | 6/2011 | Yu ........................... B60N 2/66 297/284.4 |
| 2011/0304188 A1 | 12/2011 | Aktas |
| 2011/0316317 A1 | 12/2011 | Sprenger et al. |
| 2012/0133183 A1 * | 5/2012 | Kim ......................... B60N 2/66 297/284.4 |
| 2012/0228911 A1 | 9/2012 | Piretti |
| 2013/0075571 A1 | 3/2013 | Suck et al. |
| 2013/0248675 A1 | 9/2013 | Ewald et al. |
| 2013/0313876 A1 | 11/2013 | Perrin |
| 2013/0341982 A1 * | 12/2013 | Maierhofer .............. B60N 2/66 297/284.4 |
| 2014/0138996 A1 | 5/2014 | Kramm et al. |
| 2015/0108805 A1 | 4/2015 | Linnenbrink et al. |
| 2015/0151653 A1 | 6/2015 | Furuta |
| 2015/0203011 A1 | 7/2015 | Fujita et al. |
| 2015/0314709 A1 | 11/2015 | Kim et al. |

FOREIGN PATENT DOCUMENTS

| | | |
|---|---|---|
| DE | 2723722 A1 | 12/1978 |
| DE | 3937818 A1 | 5/1991 |
| DE | 19639109 A1 | 3/1998 |
| DE | 19961070 C1 | 4/2001 |
| DE | 202006007862 U1 | 9/2007 |
| DE | 102008039166 A1 | 2/2010 |
| DE | 102009043298 A1 | 5/2011 |
| DE | 102011106219 A1 | 1/2012 |
| EP | 0842807 A1 | 5/1998 |
| FR | 703111 A | 4/1931 |
| FR | 2718398 A1 | 10/1995 |
| FR | 2889120 A1 | 2/2007 |
| JP | S5735648 B2 | 7/1982 |
| JP | S57143930 U | 9/1982 |
| JP | S59177009 A | 10/1984 |
| JP | S608121 A | 1/1985 |
| JP | 60160911 U | 10/1985 |
| JP | S616038 A | 1/1986 |
| JP | S6275735 U | 5/1987 |
| JP | S6328043 U | 2/1988 |
| JP | H04189635 A | 7/1992 |
| JP | H04115448 U | 10/1992 |
| JP | H07205690 A | 8/1995 |

(56) References Cited

FOREIGN PATENT DOCUMENTS

| | | | |
|---|---|---|---|
| JP | 2001105949 A | 10/1999 |
| JP | 2003341393 A | 12/2003 |
| JP | 2005289187 A | 10/2005 |
| JP | 2009154821 A | 7/2009 |
| KR | 2019970008834 A | 3/1997 |
| KR | 1020100049059 A | 5/2010 |
| WO | 93/25404 A1 | 12/1993 |
| WO | 94/07393 A1 | 4/1994 |
| WO | 9501888 A1 | 1/1995 |
| WO | 9720706 A1 | 6/1997 |
| WO | 03/068557 A1 | 8/2003 |
| WO | 2012009515 A1 | 1/2012 |
| WO | 2013/167975 A2 | 11/2013 |
| WO | 2013/169715 A1 | 11/2013 |
| WO | 2013/169717 A1 | 11/2013 |
| WO | 2013/169718 A1 | 11/2013 |
| WO | 2013/169719 A1 | 11/2013 |
| WO | 2013/169720 A1 | 11/2013 |

OTHER PUBLICATIONS

Search Report for Application No. PCT/US2013/039855, dated Apr. 7, 2013.
Office Action for U.S. Appl. No. 14/399,015 dated Feb. 16, 2016.
Office Action for U.S. Appl. No. 14/399,038 dated Mar. 1, 2016.
Office Action for U.S. Appl. No. 14/399,007 dated Oct. 27, 2015.
Office Action for U.S. Appl. No. 14/398,577, dated Sep. 22, 2015.
Office Action for U.S. Appl. No. 14/398,768 dated Oct. 6, 2016.
Office Action for U.S. Appl. No. 14/399,007 dated Apr. 29, 2016.
Office Action for U.S. Appl. No. 14/398,768 dated Jun. 9, 2016.
Office Action for U.S. Appl. No. 14/398,820 dated May 13, 2016.
Office Action for U.S. Appl. No. 14/399,015 dated Aug. 18, 2016.
Office Action for Korean application No. 1020147034465 dated Apr. 20, 2016.
Office Action for Japanese Application No. 2015511600, dated Jul. 5, 2016.

* cited by examiner

VEHICLE SEAT WITH A LUMBAR SUPPORT

CLAIM OF PRIORITY

This application claims priority to U.S. Application Ser. No. 61/643,587, filed May 7, 2012, the entire contents thereof are incorporated herein by reference.

The present invention relates to a vehicle seat, with a seat part and a backrest, wherein the backrest comprises a lumbar support.

Such vehicle seats are well known in the state of the art. However, there is a constant need to improve the safety of vehicle seats particularly regarding whiplash.

It was therefore the objective of the present invention to improve the safety of a vehicle seat, particularly regarding whiplash.

The object is achieved by a vehicle seat, with a seat part and a backrest, which comprises a lumbar support, wherein the lumbar support has a lumbar apex towards the back of a seat occupant and tapers from there and wherein the lumbar support comprises a suspension that results in load distribution with a primery load uptake at the lumbar apex.

The present invention relates to vehicle seat with a seat part and a backrest. In the backrest a lumbar support is provided to support the back of a seat occupant during normal use, but particularly during an impact, especially a rear impact. The lumbar support preferably extends from the bottom of a seat occupant until the shoulder region of such a seat occupant. The lumbar support is preferably a plate or has a plate-like structure and/or has a mesh-like structure. The lumbar support can be made from metal, plastic, fiber reinforced plastic or the like. This lumbar support is preferably covered with a cushion such as foam or a foam-like material and/or a seat cover. The cushion can be integral with the lumbar support or can be a separate part.

According to the present invention, the lumbar support is shaped such that it has a lumbar apex towards the back of the seat occupant. Preferably the lumbar support tapers from both sides of the lumbar apex, i.e. towards the shoulders and the bottom of a seat occupant.

Furthermore the lumbar support comprises a suspension that results in load distribution with a primary load uptake at the lumbar apex. Preferably the load uptake tapers from the primary load uptake to both sides of the lumbar apex. Preferably, in the region of the lumbar apex the suspension of the lumbar support is relatively stiff and at the shoulder- and/or the bottom-region of the seat occupant, the suspension of the lumbar support is softer in comparison to the lumbar apex, more preferably spring grounded. This results in a primary load uptake in the region of the lumbar apex and the load uptake tapers from there, preferably to both sides. Due to this load distribution and/or due to the shape of the lumbar support, whiplash of the seat occupant is at least diminished (ie the lower load in the shoulder region allows the occupants shoulders to sink into the seat during impact reducing displacement of head into headrest).

Preferably, the defection of the lumbar support is minimal at the lumbar apex.

In a preferred embodiment of the present invention, the lunbar support comprises a spring element, more preferably a cantilevered spring element. More preferably, such a spring element is provided in the shoulder- and/or the bottom region of the seat occupant. The spring element is reversibly compressed by a seat occupant during a rear impact, so that the lumbar support defelects in this region and the shape of the lumbar support alters during a rear impact. The spring element is preferably integral with the lumbar support.

Preferably, the lumbar support is preloaded, i.e. pretensioned towards the back of the seat occupant. This increases the stiffness and/or the load uptake of the lumbar support before it is overloaded.

Preferably, the backrest comprises a backpannel which prevents overload of the lumbar support.

The invention is now explained in the following text on the basis of FIGS. 1-4. These explanations are merely by way of example and do not limit the general concept of the invention.

In the figures:

FIG. 1 schematically shows a vehicle seat.

Figure 4:
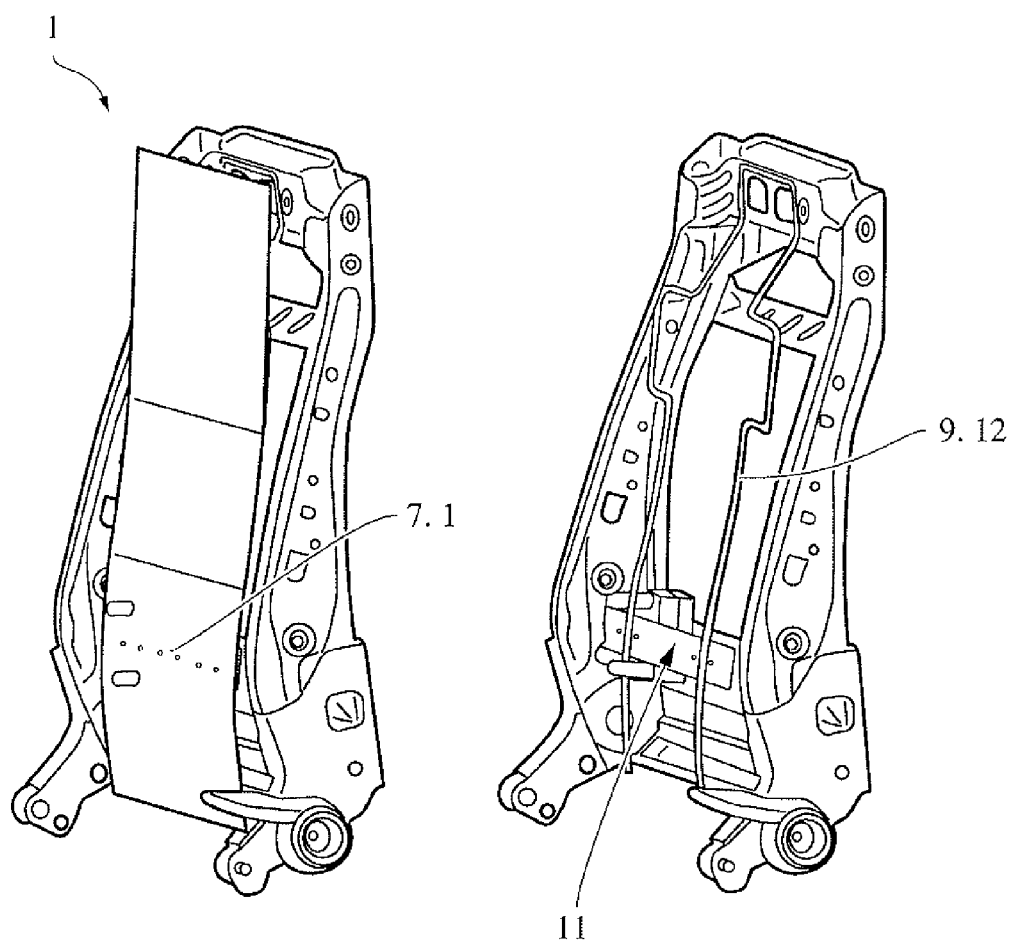

FIG. 4 shop another embodiment of the inventive vehicle seat.

Parts that correspond to one another are provided with the same reference signs in all of the figures.

Figure 1:
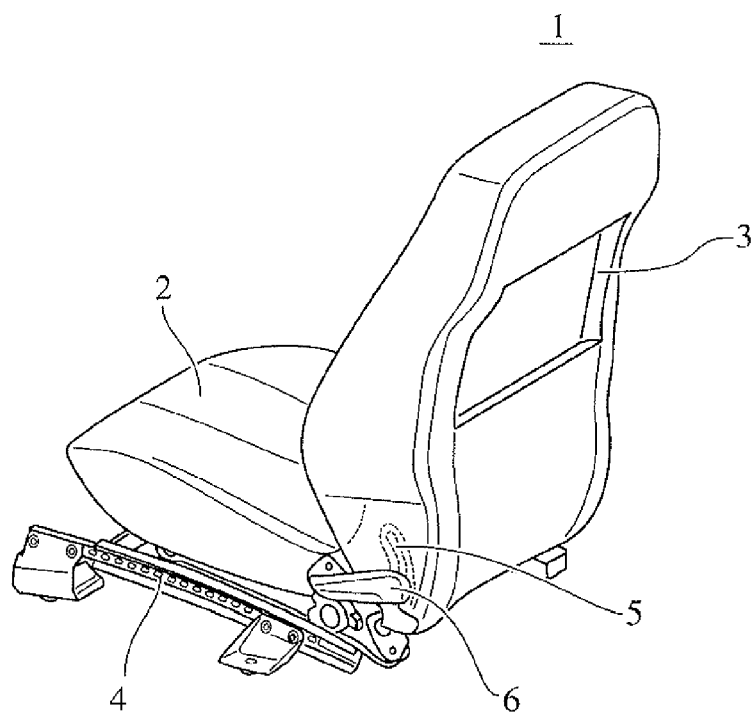

FIG. 1 schematically shows a perspective illustration of a vehicle seat 1. The vehicle seat 1 is a conventional vehicle seat and comprises at least a seat part 2 and a backrest 3. Furthermore, the vehicle seat 1 has a conventional longitudinal adjustment device 4, by means of which the vehicle seat 1 is coupled to a bodywork structure of a vehicle (not illustrated).

The seat part 2 and the backrest 3 are coupled in a pivotable manner by means of an inclination adjusting apparatus 5, wherein a vehicle user can actuate the inclination adjusting apparatus 5 by means of an adjusting lever 6. By means of the adjusting lever 6, the inclination adjusting apparatus 5 can be actuated such that it is possible to set a backrest inclination of the vehicle seat 1. A person skilled in the art will understand that the adjustment of the backrest can also take place in a motorized manner. Furthermore, the inclination adjusting apparatus can operate continuously or discontinuously.

Figure 2:
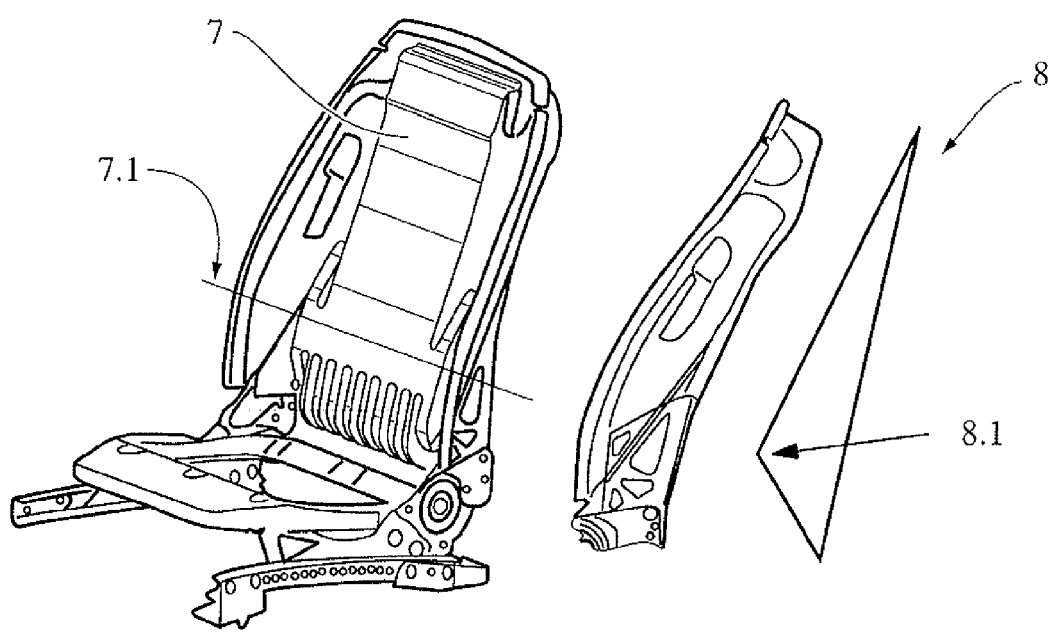
FIG. 2 shows a first embodiment of the inventive vehicle seat.

FIG. 2 shows a first embodiment of the inventive vehicle seat. This seat comprises in its backrest 3 a lumbar support 7, which extends from the seat part 2 until the shoulder region of a seat occupant. In the present case, the lumbar support 7 is made from a single piece and preferably made from a plastic material. The lumbar support 7 can be covered with a cushion material such as foam and/or can be hidden under a cover. Both has been omitted for clarity purposes. The lumbar support 7 is shaped such, that it comprises a lumbar apex 7.1, preferably above the bottom of the seat occupant. From this lumbar apex 7.1, the lumbar support tappers backwards, away from the back of a seat occupant, downwards as well as upwards. The lumbar support is suppended at the structure of the backrest of the inventive vehicle seat. As can be particularly from the load distribution 8 on the right hand side of FIG. 2, this suspension is designed such, that during a rear impact, the maximum load uptake 8.1 is at the lumbar apex. From this maximum, the load uptake tappers towards the seat part 2 as well as towards the shoulders region of the backrest. Furthermore, the lumbar support and/or its suspension is designed such, that its deflection is minimal at the lumbar apex 7.1. Due to the load uptake distribution 8 as shown in the graph on the right hand side of FIG. 2, the lumbar support provides increased safety during a rear impact. Particularly whiplash and thus injuries at the spine, the neck and/or the head of a seat occuoant is significantly reduced.

Figure 3:
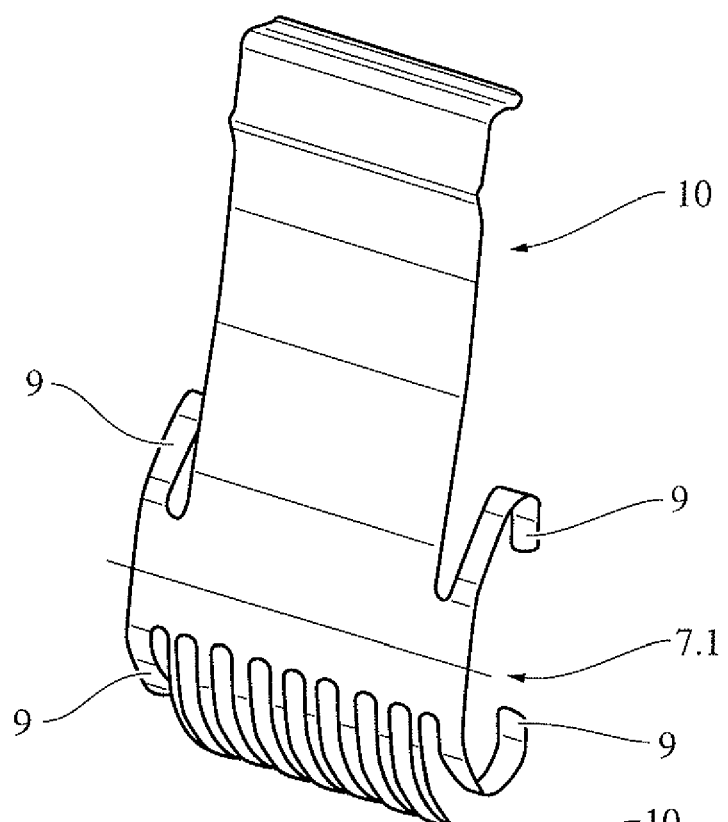
FIG. 3 shows details of the lumbar support according to FIG. 2.

FIG. 3 illustrates the lumbar support 7 utilized in the vehicle seat according to FIG. 2. The lumbar support has a plate-like structure and is made from a plastic material. In the region of the lumbar apex 7.1, the lumbar support 7 comprises means 9 for load uptake, which takes up essentially all the loads from a seat occupant. Additionally, the lumbar support is also suspended at its top and/or its bottom region. During a rear impact, the load uptake is concentrated at the lumbar apex 7.1. Preferably, the lumbar support 7 deforms elastically to support the occupant with a predefined load distribution. Preferably, the lumbar support according to the invention has three spring regions 10, one being provided in the region below the lumbar apex 7.1 and the other in the region of the shoulder of the seat occupant, and the third being primary grounding elastic element in the apex region of the seat. Preferably, all regions deform elastically in the event of a rear impact. At least one (the lower region), or both upper and lower spring regions are cantilevered. However, they do not extend over the lumbar apex 7.1. To prevent whiplash the occupant is allowed to sink into the seat due to the rate of the suspension and thereby allowing the head to make contact with the headrest without bending his neck. The lumbar is preferably locally or entirely pretensioned, so that the load uptake is increased and/or the deformation is at least locally decreased (this preload can be attained with the trimming surfaces).

FIG. 4 shows another embodiment of the inventive vehicle seat. In the present case, the structure of the backrest of the seat comprises a support bar, preferably a cross tube 11, which is located at the lumbar apex 7.1. This support bar withstands all loads from the seat occupant particularly during a rear impact and a load distribution 8 as shown in FIG. 3 with a primery load point 8.1 at the lumbar apex 7.1 is achieved. Furthermore, the inventive vehicle seat comprises a suspension 12, here a wire like suspension, which may comprise spring elements, preferably coil springs, again to achieve a load distribution 8. The spring elements particularly provide elasticity in the shoulder and/or in the bottom region of a seat occupant. The lumbar support is again plate-like.

LIST OF REFERENCE SIGNS

1 Vehicle seat
2 Seat part
3 Backrest
4 Longitudinal adjusting device
5 Inclination adjusting apparatus
6 Adjusting lever
7 Lumbar support
7.1 Lumbar Apex
8 Load distribution in the lumbar 7
8.1 primery load point, minimal defelection
9 Load uptake
10 Cantilevered spring element
11 Load uptake, cross tube
12 Load uptake, wire, spring

The invention claimed is:

1. A vehicle seat comprising a seat part and a backrest,
wherein the backrest comprises a lumbar support,
wherein the lumbar support has a plate-like structure and is made from a plastic material,
wherein the lumbar support extends over an entire length of the backrest,
wherein the lumbar support has a lumbar apex towards a back of a seat occupant and tapers from there and that the lumbar support comprises a suspension that results in a distribution of a load uptake with a primary load uptake at the lumbar apex,
wherein the lumbar support has three spring regions comprising a first spring region, a second spring region, and a third spring region,
wherein the first spring region is provided in a region below the lumbar apex,
wherein the second spring region is arranged in a region of a shoulder of the seat occupant,
wherein the third spring region is a pair of opposing primary grounding elastic elements in an apex region of the vehicle seat,
wherein the pair of opposing primary grounding elastic elements are C-shaped and protrude outside a main plane of the plate-like structure, wherein corresponding ends of the opposing primary grounding elastic elements are oriented toward each other,
wherein the three spring regions deform elastically in an event of a rear impact,
wherein at least one of the three spring regions is cantilevered, and
wherein the lumbar apex is free of a spring region being cantilevered so that deflection is minimal at the lumbar apex.

2. The vehicle seat according to claim 1, wherein the shape of the lumbar support tapers from both sides of the lumbar apex.

3. The vehicle seat according to claim 1, wherein the load uptake tapers from the primary load uptake.

4. The vehicle seat according to claim 3, wherein the load uptake tapers to both sides of the primary load uptake.

5. The vehicle seat according to claim 1 wherein, the lumbar support comprises a spring element.

6. The vehicle seat according to claim 5, wherein the spring element is cantilevered.

7. The vehicle seat according to claim 5, wherein the spring element is compressed by a seat occupant during a rear impact.

8. The vehicle seat according to claim 5, wherein the spring element is integral with the lumbar support.

9. The vehicle seat according to claim 1, wherein the backrest comprises a backpanel which prevents overload of the lumbar support.

10. The vehicle seat according to claim 1, wherein the lumbar support is preloaded.

* * * * *